(No Model.) 2 Sheets—Sheet 1.
A. P. BROOMELL.
STEERING GEAR FOR TRACTION ENGINES.
No. 298,169. Patented May 6, 1884.
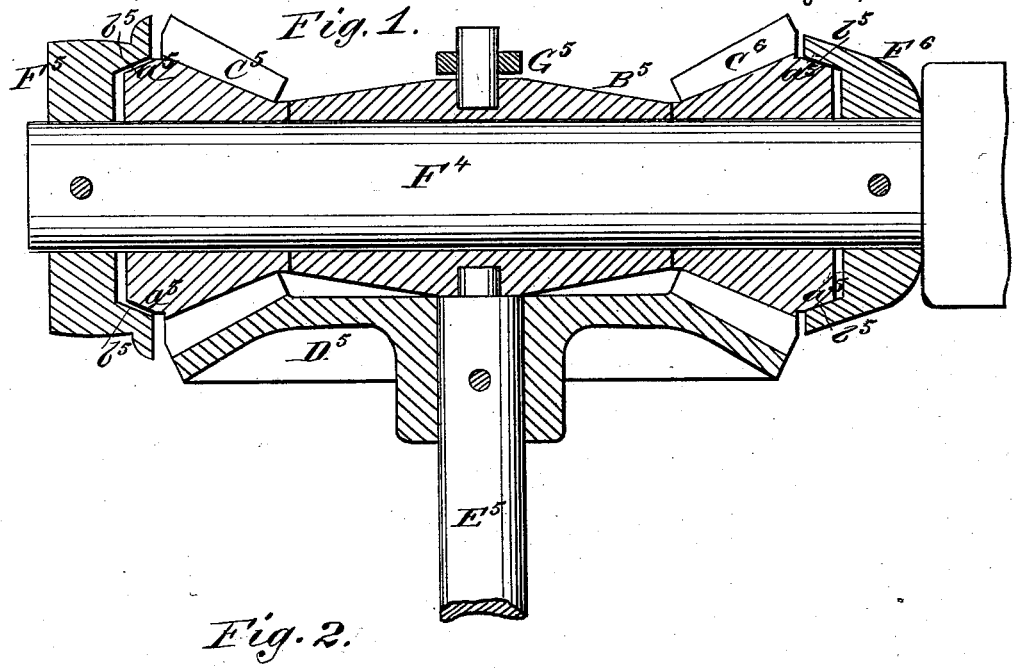
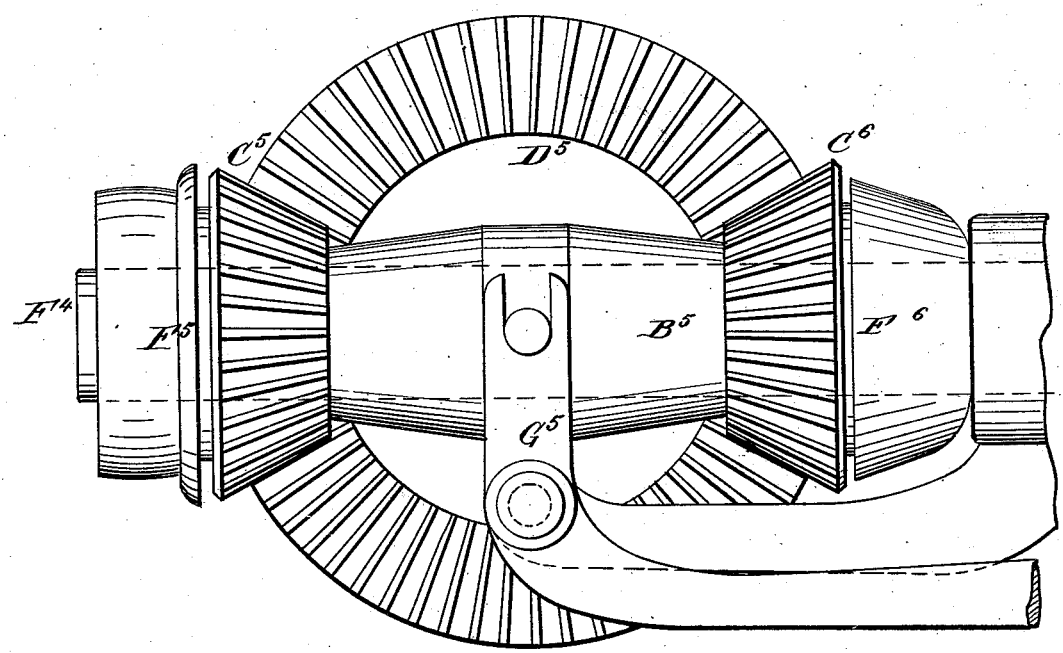
WITNESSES:
C. Neveux
Donn Twitchell
INVENTOR:
A. P. Broomell
BY Munn & Co
ATTORNEYS.

(No Model.) 2 Sheets—Sheet 2.
A. P. BROOMELL.
STEERING GEAR FOR TRACTION ENGINES.
No. 298,169. Patented May 6, 1884.
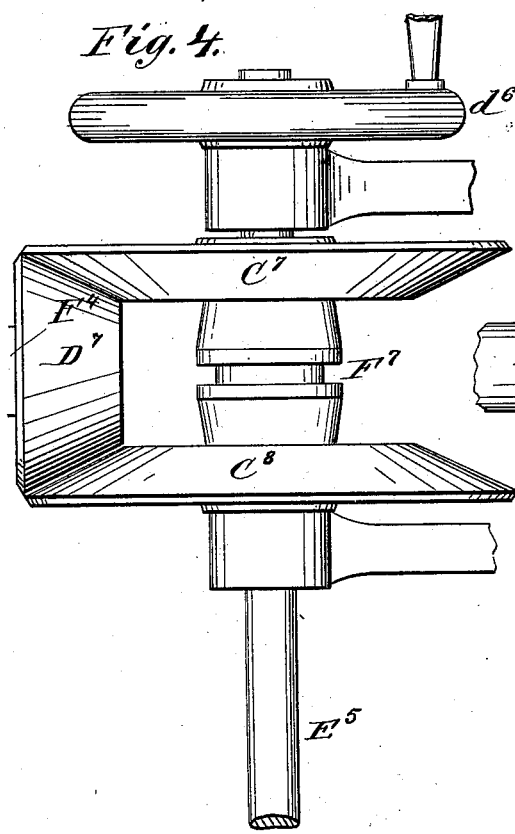
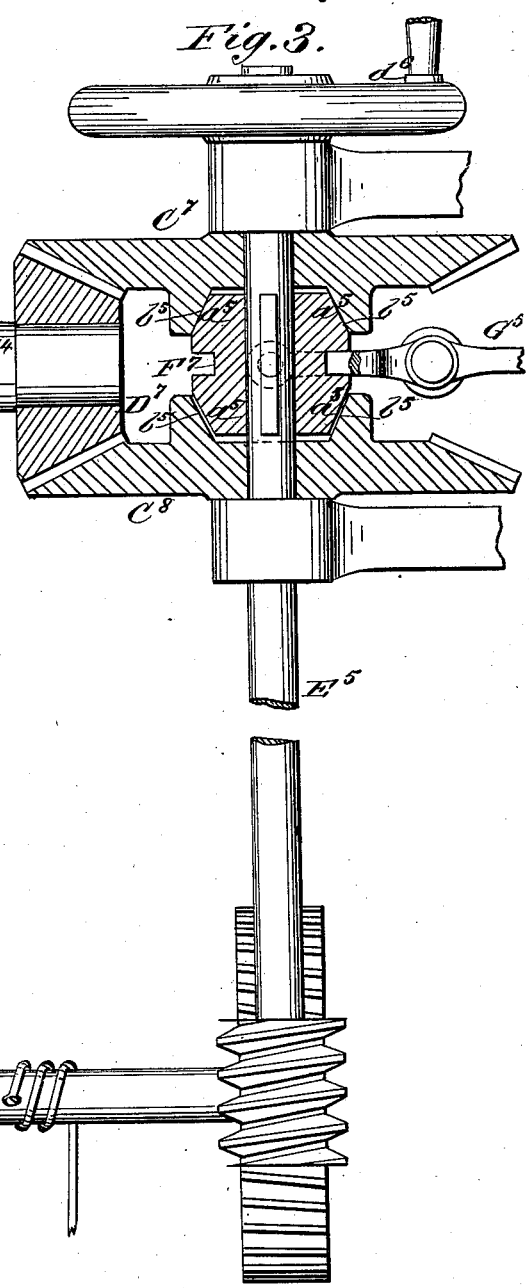
WITNESSES:
C. Neveux
Donn Twitchell
INVENTOR:
A. P. Broomell
BY Munn & Co
ATTORNEYS.

UNITED STATES PATENT OFFICE.

ALBERT P. BROOMELL, OF YORK, PENNSYLVANIA, ASSIGNOR TO ARTHUR B. FARQUHAR, OF SAME PLACE.

STEERING-GEAR FOR TRACTION-ENGINES.

SPECIFICATION forming part of Letters Patent No. 298,169, dated May 6, 1884.

Application filed February 18, 1884. (No model.)

*To all whom it may concern:*

Be it known that I, ALBERT P. BROOMELL, of York, in the county of York and State of Pennsylvania, have invented certain new and useful Improvements in Steering Mechanism for Traction-Engines, of which the following is a full, clear, and exact description.

This invention consists in certain combinations of bevel-gears and friction driving devices connected with the main or motor shaft and the reversing-shaft, by which motion is transmitted to the steering devices of a traction-engine, whereby great efficiency and smoothness of action, free from much or all liability to breakage, is obtained for the steering mechanism, substantially as hereinafter shown and described.

Reference is to be had to the accompanying drawings, forming part of this specification, in which similar letters of reference indicate corresponding parts in all the figures.

Figure 1 represents a mainly sectional front elevation of certain gears and devices used in transmitting motion from the main shaft of the motor of a traction-engine to the upright shaft which actuates the chain-winding shaft of the steering mechanism, in illustration of my invention; and Fig. 2, a plan view of the same. Fig. 3 is a partly sectional front elevation of a modification of the mechanism shown in Figs. 1 and 2, with certain adjuncts pertaining thereto; and Fig. 4, a front view of like devices, but showing friction-gears as substituted for toothed gears to transmit the necessary motion from the driving-shaft of the engine.

Referring, in the first instance, to Figs. 1 and 2 of the drawings, $F^4$ indicates the main or motor shaft of the engine, on or near the one end of which is loosely fitted a hub, $B^5$. Arranged at opposite ends of this hub, upon the shaft $F^4$, are loose bevel-pinions $C^5$ $C^6$, in constant gear with a horizontal bevel-wheel, $D^5$, on opposite sides of the axis thereof. This wheel $D^5$ is fast upon the upper end of the upright shaft $E^5$, which, as in other steering mechanisms of traction-engines, communicates motion by screw to a worm-wheel upon a lower horizontal shaft, that has wound upon it the chains connected with opposite ends of the front swiveling axle, by means of which the whole engine or machine is guided in the usual way. The outer ends or backs of the bevel-pinions $C^5$ $C^6$ are made to form smooth tapering conical bearing-surfaces $a^5$ $a^5$, which, accordingly as the hub $B^5$ is moved to the right or left, engage with or disengage from either one of two friction hubs or drivers, $F^5$ $F^6$, fast on the shaft $F^4$, and having front or inner conical dished faces, $b^5$ $b^5$, of like taper with the surfaces $a^5$ $a^5$ of the pinions $C^5$ $C^6$, whereby motion from the shaft $F^4$ is or may be transmitted by friction without jar or stoppage to either pinion $C^5$ or $C^6$, that in turn communicates motion through the wheel $D^5$ to the shaft $E^5$ to steer the engine or machine as required, motion of said shaft $E^5$ being reversed, according to which one of the pinions $C^5$ $C^6$ is slid into friction contact with its drivers $F^5$ or $F^6$, the other of said pinions then simply turning loosely or being driven by the wheel $D^5$. Both pinions $C^5$ $C^6$ being in constant gear with the wheel $D^5$, breakage of the teeth of said gears by abruptly applying the power to the steering mechanism, or when reversing the motion, is prevented. The hub $B^5$ only requires a very slight motion, which may be effected by a lever, $G^5$, to put and hold either pinion $C^5$ or $C^6$ in friction contact with its driver $F^5$ or $F^6$, so that the upper end of the shaft $E^5$ may have its bearing in the hub, and said shaft be sprung sufficiently to give the necessary movement to the hub, also so that when pressure is removed from the lever $G^5$ the spring of the shaft $E^5$ will bring back the hub $B^5$ to its normal position, and both pinions $C^5$ $C^6$ will be free to relieve themselves from close contact with the friction-drivers $F^5$ $F^6$.

In Fig. 3 of the drawings a single bevel-pinion, $D^7$, is made fast on one end of the main shaft $F^4$, and two bevel-wheels, $C^7$ $C^8$, in upper and lower gear therewith, arranged loosely upon the shaft $E^5$, which is only reversing the order of the gears. These bevel-wheels $C^7$ $C^8$ are constructed with conical dished faces $b^5$ $b^5$, and a single friction-driver, $F^7$, having upper and lower conical faces, $a^5$ $a^5$, (instead of two friction-drivers, as in the former modification,) arranged so as to be capable of adjustment up or down, by a lever, $G^5$, upon a feather on the shaft $E^5$, to put either end or face of the driver in friction-driving contact with either wheel $C^7$ or $C^8$, to give reverse steering movements to the shaft $E^5$, as required. A hand-wheel, $d^6$, may be applied to the shaft $E^5$ to effect the steering without the aid of the motor when necessary.

Fig. 4 shows the same arrangement as Fig. 3, with the exception of the pinion $D^7$ and wheels $C^7$ $C^8$ being made smooth on their meeting surfaces, so as to drive by friction, instead of by toothed contact.

Having thus described my invention, what I claim as new, and desire to secure by Letters Patent, is—

1. In steering mechanism for traction-engines, the combination, with the main or motor shaft $F^4$, and with the shaft $E^5$, by which motion is communicated, when required, in reverse directions to the steering devices, of the sliding hub $B^5$, the loose bevel-pinions $C^5$ $C^6$, having smooth conical driving-surfaces $a^5$ $a^5$ on their backs, and the fast conically-dished drivers $F^5$ $F^6$, all arranged upon the main shaft $F^4$, and the bevel-wheel $D^5$, fast on the shaft $E^5$, and in gear, on opposite sides of its axis, with the pinions $C^5$ $C^6$, essentially as and for the purposes specified.

2. In steering mechanism for traction-engines, the combination, with the main or motor shaft $F^4$, and the devices arranged thereon, consisting of the sliding hub $B^5$, the loose bevel-pinions $C^5$ $C^6$, having friction-driving conical backs $a^5$ $a^5$, and the fast conically-faced drivers $F^5$ $F^6$, of the bevel-wheel $D^5$, in gear with said pinions on opposite sides of its axis, and the shaft $E^5$, having said wheel $D^5$ secured to it, and supported at its upper end in the hub $B^5$, whereby the springing of said shaft $E^5$ is made available in controlling the release of the pinions from the friction-drivers, substantially as specified.

ALBERT P. BROOMELL.

Witnesses:
W. A. MORRISON,
W. E. FINDLEY.